United States Patent [19]

Murayama et al.

[11] Patent Number: 4,624,629
[45] Date of Patent: Nov. 25, 1986

[54] LUBRICATION MECHANISM FOR A TURBOCHARGER

[75] Inventors: Hiromi Murayama; Naoki Minamoto, both of Toyota, Japan

[73] Assignee: Aisin Seiki Kabushiki Kaisha, Kariya, Japan

[21] Appl. No.: 731,608

[22] Filed: May 7, 1985

Related U.S. Application Data

[63] Continuation of Ser. No. 498,169, May 25, 1983, abandoned.

[30] Foreign Application Priority Data

May 28, 1982 [JP] Japan .................. 57-91764

[51] Int. Cl.⁴ .................. F04B 17/00; F01M 1/00
[52] U.S. Cl. .................. 417/407; 184/6.16
[58] Field of Search .................. 417/405, 406, 407;
415/175; 184/6.16, 6.11, 11.1, 11.2, 13.1;
384/399, 412

[56] References Cited

U.S. PATENT DOCUMENTS 2,703,674  3/1955  Wood .................. 417/407
3,778,194  12/1973 Miller et al. .................. 417/407
4,142,608  3/1979  Sarle .................. 417/407
4,157,834  6/1979  Burdette .................. 277/13

Primary Examiner—Carlton R. Croyle
Assistant Examiner—Timothy S. Thorpe
Attorney, Agent, or Firm—Oblon, Fisher, Spivak, McClelland & Maier

[57] ABSTRACT

A lubricating mechanism for a turbocharger, including a housing having an exhaust gas passage and an air suction passage formed therein and an oil inlet and outlet formed therein, a turbine wheel mounted in the housing, a compressor wheel mounted in the housing, a rotatable shaft having mounted on one end thereof the turbine wheel so as to be positioned within the exhaust gas passage and at a second end thereof the compressor wheel, positioned so as to be located within the suction passage, the rotatable shaft having a large diameter oil distribution portion formed thereon and having a flange which faces an inner periphery of the housing, a bearing rotatably bearing the rotatable shaft within the housing and having a first end facing a first end surface of the oil distribution portion, the housing having an oil lubricating passage formed therein for fluidically connecting the lubricating oil inlet to the lubricating oil outlet, the lubricating passage including a first passage formed between the housing and the bearing, a second passage formed between the rotatable shaft and the bearing and a third passage formed in the oil distribution portion to thereby connect the second passage to a side of an outer periphery of the oil distribution portion.

2 Claims, 2 Drawing Figures

LUBRICATION MECHANISM FOR A TURBOCHARGER

This application is a continuation, of application Ser. No. 498,169, filed May 25, 1983, now abandoned.

BACKGROUND OF THE INVENTION

1. Field of the Invention

This invention relates to turbochargers and, more particularly, to a lubricating mechanism of a turbocharger arranged in association with an automobile vehicle engine.

2. Description of the Prior Art

In FIG. 1 showing a conventional turbocharger arranged in association with an automobile vehicle, the turbocharger 10 includes a turbine housing 13 which has an inlet 11 and an outlet 12 for the engine exhaust combustion gases, a compressor housing 15 which has an air inlet 14 and a compressed air outlet, and an intermediate housing 20 which supports a rotatable shaft 18 by means of a bearing 19 of a floating bushing. The rotatable shaft 18 has positioned on one end thereof a turbine wheel 16 which is positioned within the exhaust passage and has positioned on the other end thereof a compressor wheel 17 which is positioned within the air passage. Rotatable shaft 18 has a small diameter portion to which a collar 22 is secured by means of a screw via the compressor wheel 17.

Since the bearing 19 is limited in the leftward movement as shown in FIG. 1 thereof via the collar 22 by means of a thrust bearing 23 which is arranged for the rotatable shaft 18 and the right end of the bearing 19 faces an enlarged oil distribution portion 24, the bearing 19 also functions as axial direction bearing of rotatable shaft 18. Numeral 21 denotes a seal plate.

In such a conventional turbocharger, however, the gap between the rotatable shaft and the inner surface of the bearing 19 is small and the gap between the right end of the bearing 19 and the left end surface of the oil distribution portion 24 is small. Therefore, the lubricating oil which is supplied from a lubricating oil inlet 25 to a lubricating oil outlet 26 to thereby lubricate between the rotatable shaft 18 and the housing 20 may not be allowed to flow smoothly. As a result, the temperature of the lubricant increases and the viscosity of the lubricant is lowered such that the lubricating characteristic thereof decreases. Accordingly, the rotatable shaft is caused to be worn at a relatively high rate, especially at the side of the turbine wheel 16 which is exposed to the high temperature exhaust gases.

SUMMARY OF THE INVENTION

Therefore, it is an object of the present invention to provide a new and improved turbocharger which obviates the above-mentioned prior art drawbacks.

It is another object of the present invention to provide a new and improved turbocharger wherein a lubricating oil is apt to flow.

It is a still further object of the present invention to provide a new and improved turbocharger which is low in wear characteristic.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
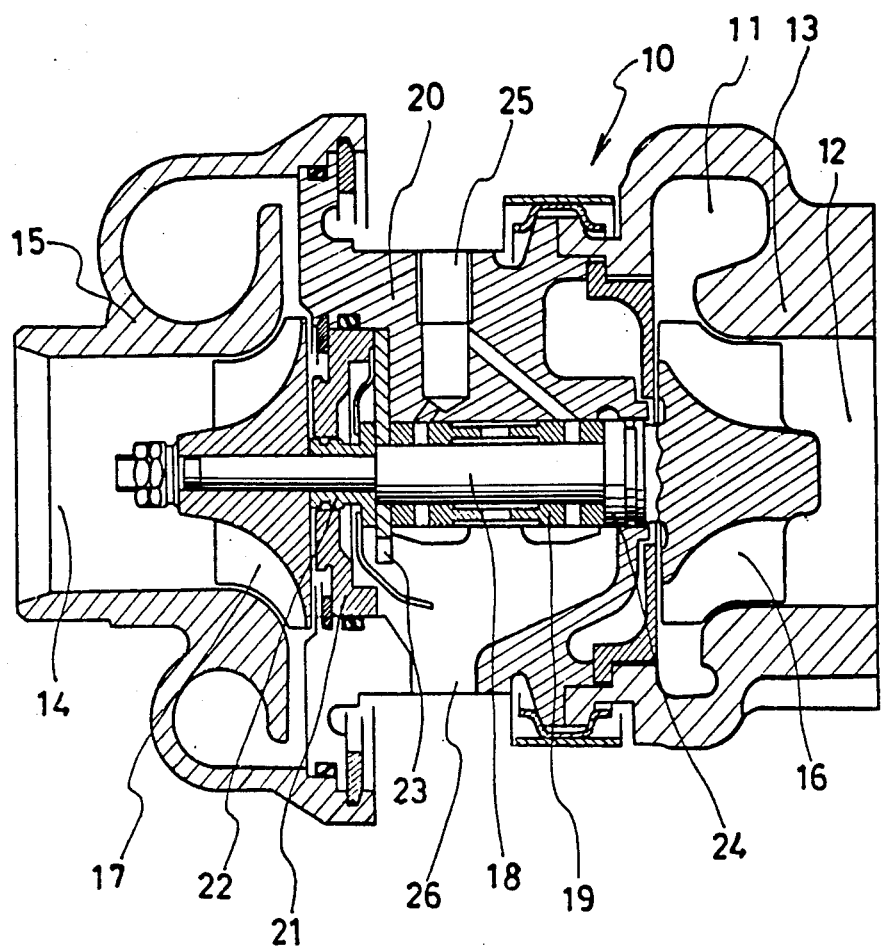
FIG. 1 is a cross sectional view of a conventional turbocharger.
Figure 2:
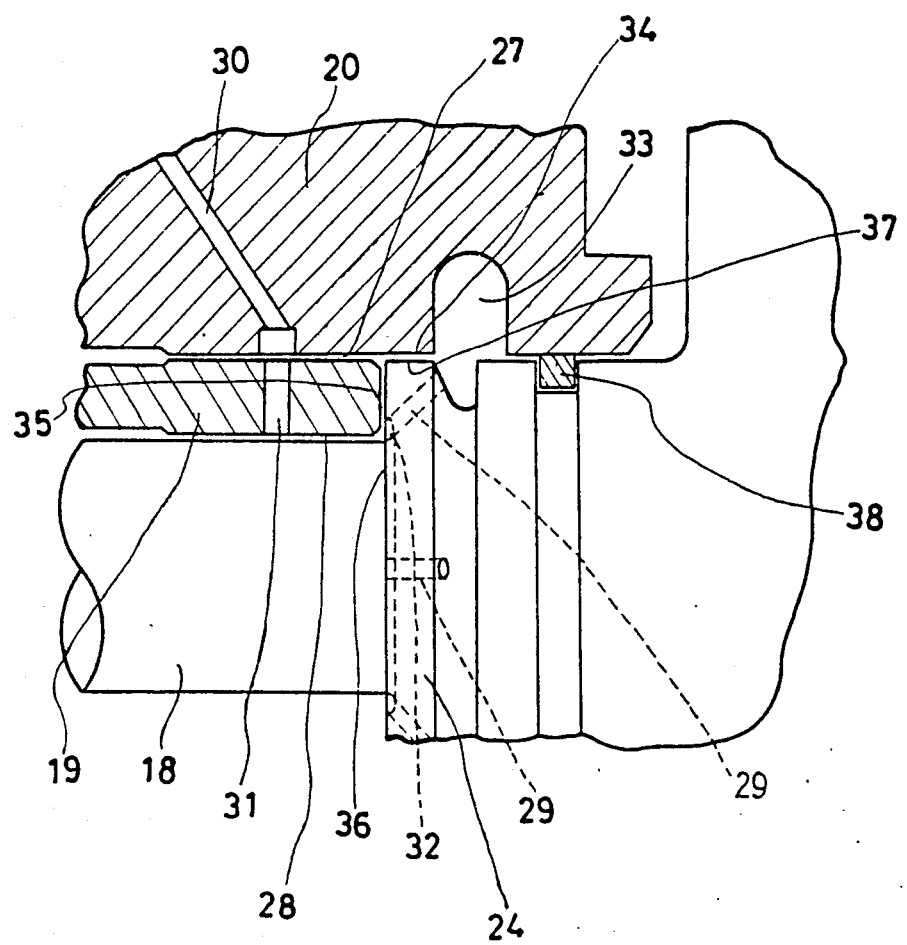
FIG. 2 is an enlarged cross sectional view of a part of a turbocharger according to the present invention.

Referring now to FIG. 2 wherein only that aspect of the present invention which is different from the prior turbocharger in FIG. 1 is illustrated, a lubricating passage which is formed in the housing 20 to thereby establish the fluid communication between the inlet 25 and the outlet 26 is shown which comprises a first passage 27 formed between the housing 20 and the bearing 19. A second passage 28 is formed between the rotatable shaft 18 and the bearing 19 and a plurality of third passages 29 are formed in the oil distribution portion 24 to thereby establish fluid communication between the second passage 28 and a fourth passage 33 formed in a part of the housing 20 which is juxtaposed to the turbine wheel 16.

A part of the lubricating oil which prevails at a passage 30 formed in the housing 20 from the inlet 25 is transmitted to the outlet 26 by means of the first passage 27 and another portion of the lubricating oil is transmitted to the outlet 26 via a passage 31 formed in the bearing 19, the second passage 28 and the third passages 29. A complete circumferential oil groove 32 is formed in the oil distribution portion 24 radially outward of the center of rotation of the third passage and at the side of the second passage 28, and the opening direction of the third passages 29 toward the outer periphery of the oil distribution portion 24 is directed to the fourth passage 33 formed in the housing 20 to thereby improve the cooling effect of that part of the housing 20 which is juxtaposed to the turbine wheel 16. The part 34 of the inner periphery which is defined by the arrangement of the passage 33 extends over the right end 35 of the bearing 19 and the left end surface 36 of the oil distribution portion 24 so as to thereby cover the large diameter flange 37 of the oil distribution portion 24. Numeral 38 denotes a seal ring.

In the above construction of the turbocharger according to the present invention, the right end 35 of the bearing 19 which faces the left end surface 36 of the oil distribution portion 24 also functions as a bearing in the axial direction of the rotatable shaft 18. Therefore, the gap therebetween may be small, however, the lubricating oil which is transmitted to the second passage 28 is easily transmitted to the outlet 26 by means of the third passages 29. Furthermore, the third passages 29 are opened to the fourth passage 33 and the rotatable shaft 18, namely the oil distribution portion 24 rotates at a high speed in comparison with rotation of the bearing 19. Therefore, the volume lubricating oil which flows from the second passage 28 to the outlet 26 via the third passages 29 is apt to be increased more due to the centrifugal force generated by the rotation of the oil distribution portion 24. Since the inner periphery 34 of the housing 20 extends so as to cover the flange 37 of the oil distribution portion 24, the lubricating oil is held between the right end 35 of the bearing 19 and the left end surface 36 of the oil distribution portion 24 and thus the wear therebetween is reduced.

The flow of the lubricating oil into the third passages 29 is assured by means of the arrangement of the oil groove 32 even when the bearing 19 and the rotatable shaft 18 are not coaxial.

While a preferred embodiment of the invention has been described, it will be readily apparent to those skilled in the art that various changes and arrangements can be made to accomplish the objects of the invention without departing from the scope and spirit of the appended claims.

What is claimed as new and desired to be secured by Letters Patent of the United States is:

1. A lubricating mechanism for a turbocharger, comprising:

a housing having an exhaust gas passage and an air suction passage formed therein and an oil inlet and outlet formed therein;

a turbine wheel mounted in said housing;

a compressor wheel mounted in said housing;

a rotatable shaft having mounted on one end thereof said turbine wheel so as to be positioned within said exhaust gas passage and on a second end thereof said compressor wheel positioned so as to be located within said suction passage, said rotatable shaft having a large diameter oil distribution portion formed thereon and having a flange which faces an inner periphery of said housing;

a bearing rotatably supporting said rotatable shaft in an axial direction within said housing and having a first end facing a first end surface of said oil distribtuion portion;

said housing having an oil lubricating passage formed therein for fluidically connecting said lubricating oil inlet to said lubricating oil outlet, said lubricating passage including first passage means formed between said housing and said bearing, second passage means formed between said rotatable shaft and said bearing and a plurality of third passage means formed circumferentially in said flange of said oil distribution portion to thereby connect said second passage means to a radially extending fourth passage means formed in a part of said housing which is juxtaposed to said turbine wheel wherein said housing has an oil communication passage formed therein and said bearing has an oil passage formed therein such that said oil communication passage of said housing is in communication with said first passage means and said oil passage means formed in said bearing, and such that said oil passage means formed in said bearing is in communication with said first passage means and said second passage means; and said rotatable shaft having a complete circumferential groove formed in said first end surface of said oil distribution portion and which is in communication with said second passage means and said third passage means so as to provide cooling of said housing wherein at least a portion of said complete circumferential groove is located between said third passage means and said second passage means and wherein said complete circumferential groove is formed so as to be located radially outwardly of the center of rotation of said rotatable shaft and adjacent said second passage.

2. A lubricating mechanism for a turbocharger as set forth in claim 1, wherein said inner periphery of said housing extends over said first end of said bearing and said first end surface of said oil distribution portion to said flange of said oil distribution portion.

* * * * *